Sept. 14, 1948. T. BROWN 2,449,159
TRACTOR CULTIVATOR
Original Filed Sept. 17, 1942 2 Sheets-Sheet 1

INVENTOR
THEOPHILUS BROWN
BY
ATTORNEYS

Sept. 14, 1948.                T. BROWN                2,449,159
TRACTOR CULTIVATOR
Original Filed Sept. 17, 1942                2 Sheets-Sheet 2

INVENTOR
THEOPHILUS BROWN
BY
ATTORNEYS

Patented Sept. 14, 1948

2,449,159

UNITED STATES PATENT OFFICE 2,449,159

TRACTOR CULTIVATOR

Theophilus Brown, Moline, Ill., assignor to Deere & Company, Moline, Ill., a corporation of Illinois Original application September 17, 1942, Serial No. 458,712. Divided and this application February 3, 1945, Serial No. 576,026

14 Claims. (Cl. 97—47)

The present invention relates generally to tractor cultivators and has for its principal object the provision of a novel and improved tractor cultivator for cultivating a single row of crops. This application is a division of my copending application, Serial No. 458,712, filed September 17, 1942, now U. S. Letters Patent 2,378,615, issued June 19, 1945.

A more specific object relates to the provision of a tractor cultivator in which the operator is afforded an unusually clear and unobstructed view of the row of plants being cultivated and also of the cultivating tools as they engage the soil beside the plants. According to the present invention, the operator's seat is placed at the forward end of the tractor frame directly above and behind the tools, and the engine is disposed at the rear end of the frame where the connections with the rear traction wheels are shorter and more direct.

Still another object of this invention has to do with the provision of a novel and improved front truck for the tractor, of such construction and arrangement as to provide a clear and unobstructed space between the two front dirigible wheels for mounting cultivating tools and other implements, providing a clear view thereof from the operator's seat, and by virtue of the position of such tools adjacent the front wheels of the tractor, the direction of travel of the tools can be quickly and easily changed or controlled by steering of the tractor, such as when cultivating corn and other crops. A related object has to do with the provision of means for mounting cultivating tools on the foretruck of the tractor, the latter being rockable about a longitudinally extending axis, thereby providing for movement of the tools with the foretruck when traveling over uneven ground.

These and other objects and advantages of my invention will be apparent to those skilled in the art after a consideration of the following description, in which reference is had to the drawings hereto, in which Figure 1 is a plan view of a tractor with cultivator attachment, embodying the principles of the present invention;

Figures 1, 3, 4:
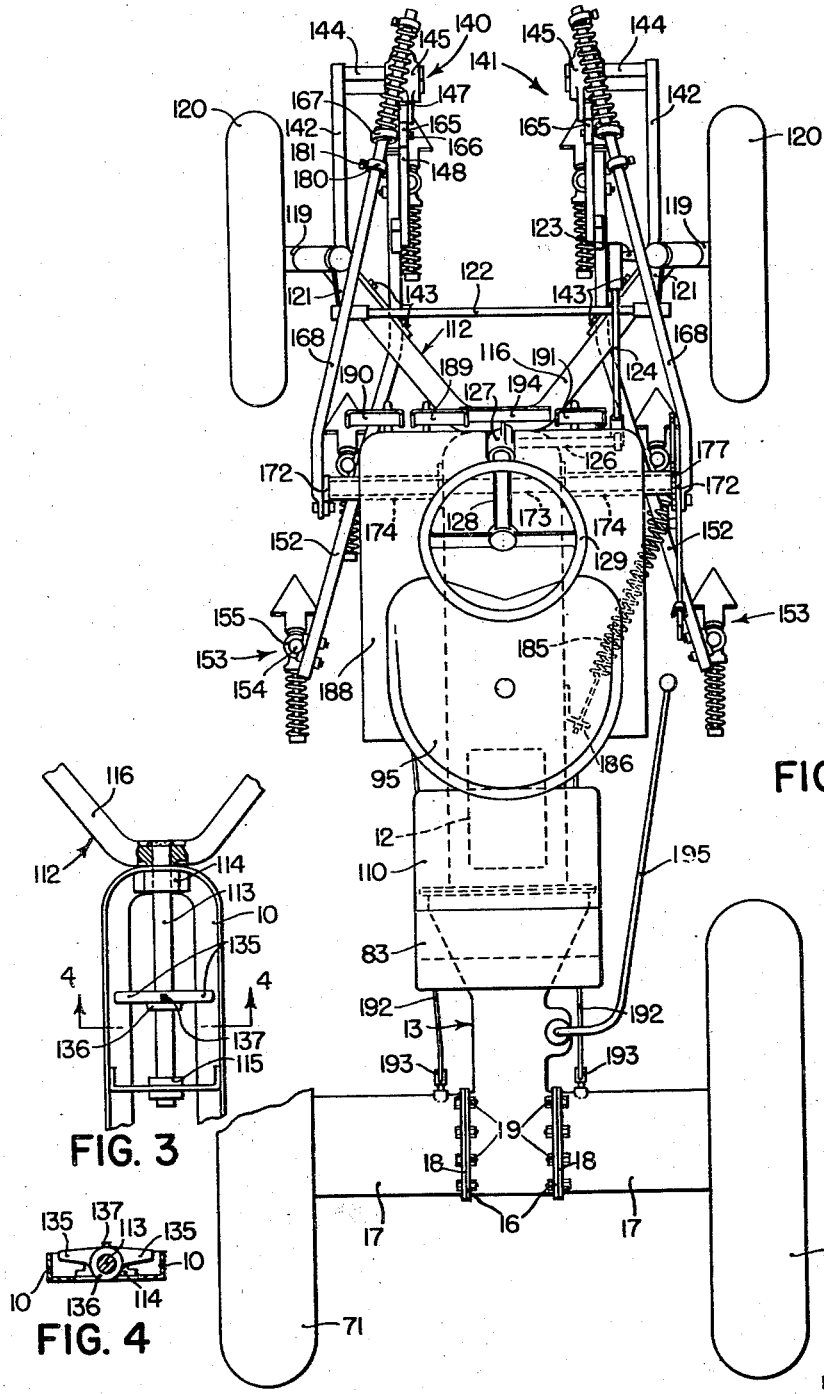
Figure 3 is a plan view of the forward end of the tractor frame, showing in detail the connection of the foretruck to the forward end of the frame.
Figure 4 is a sectional elevational view through the tractor frame, taken along a line 4—4 in Figure 3.
Figure 2:
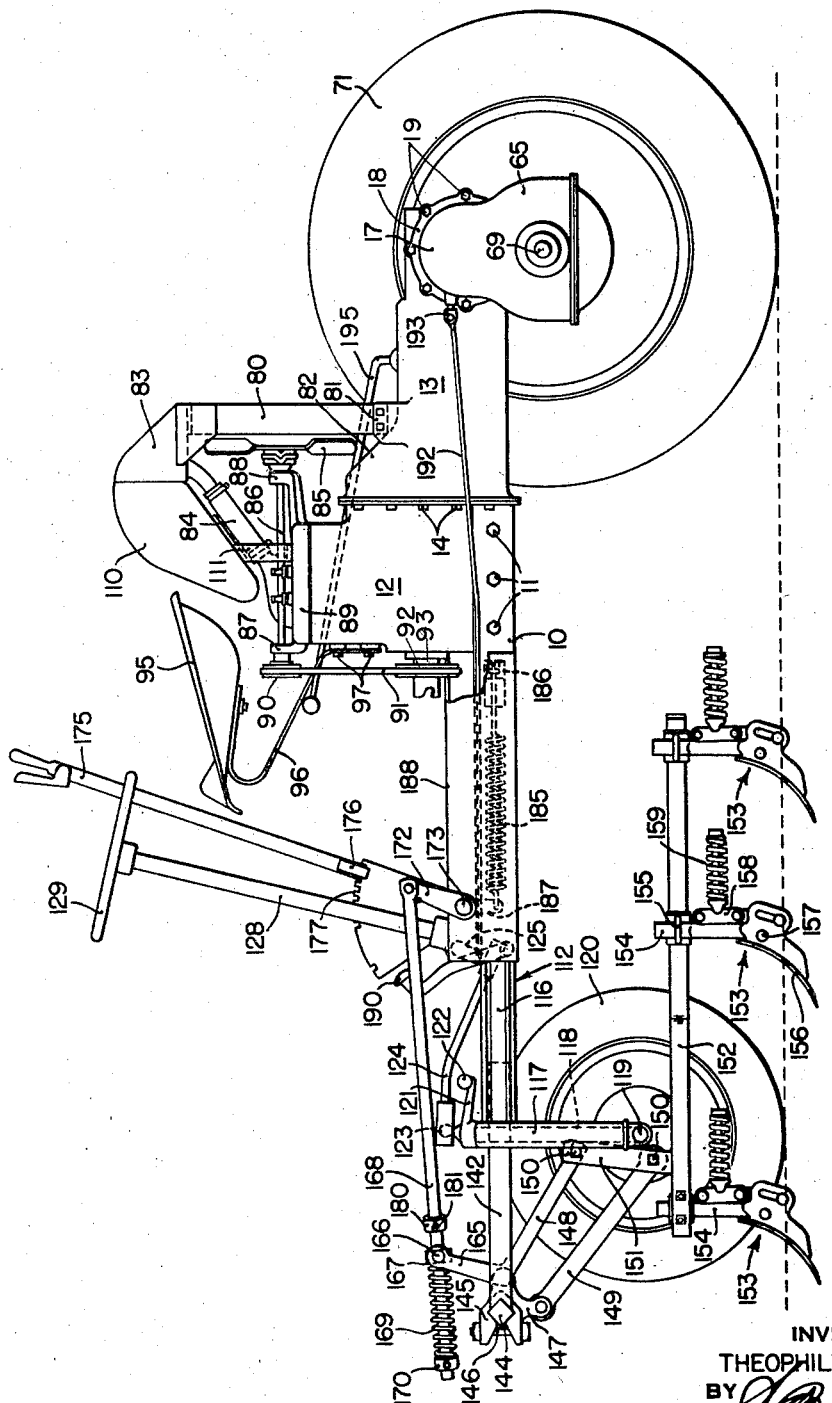
Figure 2 is a side elevational view of the tractor cultivator.

Referring now to the drawings, the tractor frame comprises a pair of laterally spaced frame members formed by a structural angle bar 10 bent into a U-shape as best shown in Figure 3, the ends of the bar 10 being secured by bolts 11 to the lower portion of an internal combustion engine 12, and a unitary transmission housing 13 rigidly bolted to the cylinder block of the engine 12 by means of bolts 14, the frame bar 10, engine 12, and housing 13 constituting a narrow longitudinally extending tractor body.

The rear end of the transmission housing 13 is provided with aligned openings in the opposite side walls thereof, respectively, and having annular flanges 16 about the openings. A pair of laterally extending tubular rear axle housings 17 are provided with annular flanges 18 which lie in abutment with the flanges 16 on the transmission housing and are fixed thereto by bolts 19.

The outer ends of the housings 17 are provided with downwardly turned final drive housings 65, each containing a pair of final drive gears (not shown) for driving a stub axle 69 on which is mounted a rear traction wheel 71.

The engine 12 is cooled by means of a water cooling system including a radiator 80 mounted on a pair of laterally spaced lugs 81 on top of the unitary transmission housing 13, the latter being provided with a rearwardly and downwardly inclined top wall 82 in order to position the radiator 80 as low as possible. A water compartment 83 is provided at the top of the radiator 80 and is connected with the engine through a suitable hose connection 84. The lower end of the radiator is, of course, connected with the lower part of the engine by another suitable hose connection (not shown).

The radiator 80 is cooled by a fan 85 disposed directly ahead of the radiator on the rear end of a drive shaft 86 which is journaled in a pair of front and rear brackets 87, 88, respectively. The brackets are rigidly fixed to the front and rear ends of the cylinder head 89. A belt pulley 90 is fixed to the forward end of the fan drive shaft 86 and is connected by a suitable V-belt 91 or the equivalent, with a drive sheave 92 mounted on the forward end of the crank shaft 93.

An operator's seat 95 is carried on a supporting bracket 96 which is secured by supporting bolts 97 on the front of the engine block. The seat 95 is positioned above the forward end of the engine 12 and is high enough so that an operator seated in the seat 95 can look rearwardly over his shoulder and obtain a clear and unobstructed view of the ground directly behind the rear axle housings 17.

A fuel tank 110 is disposed between the operator's seat 95 and the water compartment 83. The forward end of the tank is supported on brackets 111 carried on the cylinder head and the rear wall of the tank lies against the forward wall of the water compartment 83 and is fixed thereto by any suitable supporting means. The front of the fuel tank is inclined downwardly and forwardly beneath the rear of the seat 95 to provide clearance for the latter.

The forward end of the tractor frame 10 is carried on a Y-shaped foretruck, indicated in its entirety by reference numeral 112. The foretruck 112 comprises a longitudinally extending cylindrical bearing portion 113, journaled at its front and rear ends in bearings 114, 115 mounted on the frame 10 and providing for rocking movement of the bearing portion 113 about a generally horizontal, centrally disposed axis, and a U-shaped axle beam member 116 that is rigidly fixed, as by welding, to the front end of the bearing portion 113, which extends forwardly beyond the tractor frame 10, as best shown in Figure 3. The U-shaped axle member 116 consists of a structural beam of I-section, the ends of which are bent to provide a pair of forwardly diverging arms. At the forward end of each arm a vertically disposed sleeve 117 is rigidly fixed, as by welding, and within which sleeve is disposed a vertical spindle 118, the lower end of which is provided with an outwardly extending axle 119. A pair of supporting wheels 120 are journaled on the axles 119, respectively, substantially in fore and aft alignment with the rear traction wheels 71. The spindles 118 extend upwardly beyond the tops of the sleeves 117 and are provided with crank arms 121, which extend rearwardly therefrom. The crank arms 121 are interconnected by a transversely disposed tie rod 122, and one of the spindles, the one on the right side of the tractor as viewed in Figure 1, is provided with an extra crank arm 123 extending laterally inwardly, and is pivotally connected with a rearwardly extending steering link 124, the latter being connected at its rear end to a crank arm 125 on a rockshaft 126, which extends laterally inwardly to a conventional worm gear mechanism 127 on the lower end of a steering column 128, which is mounted on the forward end of the tractor frame in front of the seat 95. A steering wheel 129 is fixed to the upper end of the steering column in convenient position to the operator. If desired, the steering column 128 can be of the angularly adjustable type to provide fore and aft adjustment of the wheel 129 relative to the seat 95.

It is evident that the above described foretruck, by virtue of its pivotal connection with the tractor frame, is sufficiently flexible to follow the uneven contour of the ground and to distribute the weight of the tractor and associated tools upon the two front wheels. The amount of rocking movement of the foretruck, however, is limited by means of a pair of stop arms 135, mounted rigidly on a hub member 136, embracing the bearing portion 113 of the Y-shaped truck member 112. The hub 136 is fixed to the central bearing portion 113 by means of a set screw 137, as best shown in Figures 3 and 4. The stop arms 135 extend laterally over the lower flanges of the tractor frame 10, but are spaced above the latter to provide a limited amount of rocking movement about the fore and aft extending axis of the central bearing portion 113.

The widely diverging supporting arm portions 116 of the foretruck 112 provide a clear space therebetween, which is within the direct line of vision of the operator when seated on the operator's seat 95. This space is available for cultivating tools or other implements, which, when so placed are not only in a convenient position for observation from the operator's position, but can be accurately controlled by steering the dirigible front wheels 120 of the tractor.

The drawings show a pair of cultivator rigs mounted on the forwardly diverging arms 116 of the foretruck 112, respectively, to position the cultivating tools on opposite sides of the fore and aft extending center line of the tractor, for the purpose of cultivating a row of crops over which the tractor straddles to place the plants beneath the tractor center line.

Each of the two cultivator assemblies 140, 141, comprises a supporting beam 142, rigidly fixed by means of removable bolts 143 against the inner sides of the arms 116, and extending forwardly from the forward ends of the arms and terminating ahead of the dirigible front wheels 120. A stub arm 144 is rigidly fixed, as by welding, to the front end of the beam 142 and extends laterally inwardly therefrom and terminates at a point outwardly from the center line of the tractor in order to provide a clear space for the plants in the row to be cultivated. A cultivator supporting bracket 145 is rigidly clamped by means of a bolt 146 to the arm 144, the latter being of square cross section. Lateral adjustment of the bracket 145 is obtainable by loosening the bolt 146 and sliding the bracket laterally along the square arm 144.

The bracket 145 is provided with a pair of lugs 147, formed on the rear side thereof, to which are swingably connected a pair of draft links 148, 149, spaced vertically and extending rearwardly therefrom. The rear ends of the links 148 and 149 are pivotally connected by means of bolts 150 to a generally vertical standard 151, which is rigidly fixed as by welding to a generally horizontal rig beam 152. A plurality of cultivating tools 153 are mounted on each of the rig beams 152, in spaced relation therealong. Each of the tools comprises a vertical shank 154, secured by a U-bolt clamp 155 to the rig beam 152 and extending downwardly therefrom. At the lower end of the shank 154, a cultivator shovel 156 is pivotally connected by a transverse bolt 157, permitting the shovel 156 to swing rearwardly when it encounters an obstruction in the field during operation. Normally, the shovel is held in operating position by means of a pair of toggle links 158, which are urged into locking position by a spring 159. Inasmuch as the details of the cultivator tools are not considered a part of this invention, a detailed description thereof is not deemed necessary.

Each of the cultivator rigs is raised and lowered through a crank arm 165, fixed to the upper link 148 and extending upwardly therefrom. The upper end of the crank arm 165 is pivotally connected by a trunnion 166 to a collar 167 embracing a control rod 168. A compression spring 169 embraces the control rod 168 ahead of the collar 167 and bears against a collar 170 fixed to the forward end of the control rod. The two rods 168 for the two cultivator assemblies 140, 141, extend rearwardly in diverging relation and are pivotally connected to a pair of upwardly extending arms 172, which are rigidly fixed to a transverse rockshaft 173, the latter being journaled in a pair of supporting sleeves 174 fixed to the tractor frame 10 and extending laterally outwardly therefrom. One of the arms 172 is extended upwardly to serve as a handle 175, which is secured in adjusted position by means of a conventional latch mechanism 176, which engages a notched sector 177, fixed to the supporting sleeve 174 and carried thereby. By pulling the lever 175 rearwardly, the spring 169 is compressed, forcing the cultivator shovels downwardly into the ground, but allowing them to float against the action of the spring 169. When the lever 175 is swung forwardly, a collar 180 on the rod 168 engages the collar 167 and swings the arm 165 forwardly, thereby raising the links 148, 149 and the cultivator rig. The collar 180 is adjustably fixed to the rod 168 at any desired position thereon by means of a set screw 181.

Thus it is evident, that each of the cultivator rigs is permitted a limited amount of vertical floating movement independent of the other, while both rigs are mounted on the foretruck and therefore swing with the latter about the fore and aft extending axis of the central bearing portion 113. There is sufficient looseness in the connections between the rockshaft 173 and the arms 165 to provide for a limited amount of rocking movement of the foretruck. The weight of the cultivator rigs is counterbalanced by means of a spring 185 connected between a lug 186 on the side of the tractor frame and an arm 187 on the rockshaft 173.

During operation, the operator sits on the seat 95 or stands on the platform, 188, which is supported on the frame members 10. A clutch pedal 189 is disposed at the forward edge of the platform 188 and is connected by suitable means (not shown) to the clutch mechanism in the usual manner. A pair of brake pedals 190, 191, are mounted at opposite sides of the clutch pedal 189 and are connected by brake rods 192 to a pair of brake band actuating members 193 for operating independent brakes on the two drive axles in the axle housings 17. Thus, either of the brakes can be applied separately for purposes well-known to those skilled in the art. The clutch pedal 189 has a lateral extension 194 adjacent the brake pedal 191 on the right side of the tractor, to permit the clutch to be released by the right foot of the operator when he is applying the brake pedal 190 with his left foot. The change-gears in the transmission housing 13 are controlled by a gear shift lever 195 extending forwardly to a position within reach of the operator.

It will now be clear to those skilled in the art that the machine shown and described herein has distinct advantages as a one-row tractor cultivator. The operator has full and complete vision of the cultivator shovels, directly in front of him without any obstruction to his line of vision, and by virtue of the position of the cultivators relative to the front wheels, the guiding of the cultivators along a plant row is facilitated.

I claim:

1. In a tractor cultivator, a frame, a front axle member connected thereto by means providing for relative lateral rocking movement about a fore and aft extending axis, wheels mounted at the outer ends of said axle member, a pair of cultivator supporting beams detachably secured to said axle member in laterally spaced relation and extending forwardly from said axle member, a pair of cultivator rigs disposed in laterally spaced relation under said axle member, and generally forwardly extending means for connecting said rigs to the forward portions of said beams, respectively, providing for vertical movement of said rigs relative to said beams generally underneath said axle member.

2. In a tractor cultivator, a frame, a front axle member including forwardly diverging sections and generally downwardly extending spindle-receiving means at the forward ends of said diverging sections, wheels mounted on said spindle-receiving sections of said axle member, a pair of supporting beams fixed to the forwardly diverging portions of said axle member in laterally spaced relation and extending forwardly therefrom generally directly ahead of said spindle-receiving sections, a pair of cultivator rigs disposed in laterally spaced relation and having cultivating tools mounted thereon for cultivating a single row of crops beneath said frame, and means for connecting said rigs to the forward ends of said beams, respectively, providing for vertical movement of said rigs relative to said beams.

3. In a tractor cultivator, a frame, a front axle member comprising forwardly diverging sections having spindle-receiving portions at their forward ends, wheels mounted on the spindle-receiving portions of said axle member, a pair of cultivator supporting beams fixed to the forwardly diverging sections of said axle member in laterally spaced relation and extending forwardly therefrom generally in front of said spindle-receiving portions, a pair of cultivator rigs disposed in laterally spaced relation and having cultivating tools mounted thereon for cultivating a single row of crops beneath said frame, means for connecting said rigs to the forward ends of said beams, respectively, providing for vertical movement of said rigs relative to said beams, and an operator's seat mounted on said frame above and behind said axle member and positioned so that the operator's line of sight, when the operator is seated on said seat, extends downwardly to the front rigs generally between the forwardly diverging sections of said front axle member, so as to provide the operator with a clear and unobstructed view of the ground between said rigs.

4. In a tractor cultivator, a frame, a front axle member connected thereto by means providing for relative lateral rocking movement about a fore and aft extending axis, supporting wheels mounted at the outer ends of said axle member, a pair of cultivator supporting beams fixed to said axle member in laterally spaced relation and extending forwardly therefrom as cantilever supports, a pair of cultivator rigs disposed in laterally spaced relation and having cultivating tools mounted thereon for cultivating a single row of crops beneath said frame, means for connecting said rigs to the forward ends of said beams, respectively, providing for vertical movement of said rigs relative to said beams, and means for raising said rigs simultaneously including a pair of lifting arms supported near the forward ends of said beams, a pair of links connected with said lifting arms and extending rearwardly along said beams, a rockshaft disposed transversely behind said axle member, means connecting said links with said rockshaft, and means for rocking said rockshaft to lift said rigs.

5. In a tractor cultivator, a frame, an operator's seat mounted near the forward end of said frame, a front axle member mounted at the forward end of the frame and having arm portions diverging forwardly to provide a clear space therebetween, a wheel mounted on the outer end of each arm portion, a cultivator supporting beam rigidly mounted on the forward end of each of said arm portions, a pair of vertically spaced links pivotally connected to each of said beams generally forward of the diverging arm portions of said front axle member and extending rearwardly therefrom, and a cultivator rig swingably mounted at the rear end of each pair of links, said rigs being disposed side by side in said clear space within the direct line of vision of an operator seated on said seat.

6. In a tractor cultivator, a frame, a Y-shaped front axle member having a central supporting portion and a pair of diverging arm portions, bearing means at the forward end of said frame for rockably mounting said central portion on a fore and aft extending axis with said arms extending ahead of said frame in diverging relation, wheels mounted at the forward ends of said arms, a pair of cultivator supports fixed to said arms adjacent the forward ends thereof, respectively, a pair of cultivator rigs disposed between the ends of said arms in laterally spaced relation and having cultivating tools mounted thereon for cultivating a single row of crops therebetween, and means connecting said rigs to said cultivator supports, respectively, providing for vertical movement of said rigs relative thereto.

7. In a tractor cultivator, a frame, a Y-shaped front axle member having a central supporting portion and a pair of diverging arm portions, bearing means at the forward end of said frame for rockably mounting said central portion on a fore and aft extending axis with said arms extending ahead of said frame in diverging relation, wheels mounted at the forward ends of said arms, and a pair of cultivator supporting beams rigidly fixed to said arms adjacent the forward ends thereof, respectively, and extending forwardly therefrom, stub bars fixed to the forward ends of said beams, respectively, and extending inwardly toward each other but terminating at their inner ends in laterally spaced relation to permit a row of crops to pass therebetween, a pair of cultivator rigs disposed between said supporting beams in laterally spaced relation and having cultivating tools mounted thereon for cultivating said crop row therebetween, and means connecting said rigs to said stub bars, respectively, providing for vertical movement of said rigs relative thereto, said connecting means including means adjustable laterally on said stub bars for varying the lateral spacing between said rigs.

8. A motor cultivator comprising a longitudinally disposed frame, a Y-shaped front axle member having a central supporting portion and a pair of diverging arm portions, bearing means at the front end of said frame for rockably mounting said central portion on a fore and aft extending axis with said arms diverging ahead of said frame, a dirigible front wheel mounted on the outer end of each of said arms, a cultivator supporting beam rigidly mounted on each of said arms and extending forwardly therefrom, a pair of cultivator rigs disposed side by side between said front wheel supporting arms, means swingably connecting said rigs with said supporting beams, respectively, an operator's seat mounted at the forward end of said frame to position the operator to obtain a clear view of said rigs during cultivating operation on a single row of plants beneath the frame, an engine mounted on said frame behind said seat, and a pair of laterally spaced rear traction wheels mounted on said frame behind said motor and operatively connected thereto.

9. In a tractor cultivator, a frame, an operator's seat mounted near the forward end of said frame, a Y-shaped front axle member having a central supporting portion and a pair of diverging arm portions, bearing means at the front end of said frame for rockably mounting said central portion on a fore and aft extending axis with said arms diverging ahead of said frame to provide a clear space therebetween, a wheel mounted at the outer end of each arm portion, a cultivator supporting beam rigidly mounted on each of said arm portions and extending forwardly therefrom, a pair of vertically spaced links pivotally mounted at the forward end of each of said beams and extending rearwardly therefrom, a cultivator rig swingably mounted at the rear end of each of said pairs of links, said rigs being disposed side by side in said clear space within the direct line of vision of an operator seated on said seat, a crank arm connected to one of each pair of links, a pair of operating rods pivotally connected to said crank arms and extending rearwardly therefrom over the adjacent axle arm portion at opposite sides of said clear space, respectively, a transverse rockshaft journaled for rocking movement on said frame behind said clear space, and means for rocking said rockshaft to raise and lower said rigs.

10. In a tractor cultivator, a frame, a front axle member connected therewith, supporting wheels mounted at the outer ends of said axle member, a pair of cultivator supporting beams fixed to said axle member in laterally spaced relation and extending forwardly therefrom as cantilever supports, a pair of cultivator rigs disposed in laterally spaced relation and having cultivating tools mounted thereon for cultivating a single row of crops beneath said frame, means for connecting said rigs to the forward ends of said beams, respectively, providing for vertical movement of said rigs relative to said beams, and means for raising said rigs simultaneously, including a pair of lifting arms connected with said rig connecting means for raising and lowering the latter, a pair of links connected with said lifting arms and extending rearwardly along said beams, and means on said frame rearwardly of said axle member for shifting said links to raise and lower said rigs.

11. In a tractor cultivator, a frame, a front axle member having a central supporting portion and a pair of forwardly diverging arm portions, bearing means at the forward end of said frame for rockably mounting said central portion on a fore and aft extending axis with said arms extending ahead of said frame in diverging relation, wheels mounted at the forward ends of said arms, a pair of cultivator supports fixed to said arms, a pair of cultivator rigs disposed between the ends of said arms in laterally spaced relation and having cultivating tools mounted thereon for cultivating a single row of crops therebetween, and means connecting said rigs to said cultivator supports, respectively, providing for vertical movement of said rigs relative thereto.

12. In a tractor cultivator, a frame, a front axle member having a central supporting portion and a pair of forwardly diverging arm portions, bearing means at the forward end of said frame for rockably mounting said central portion on a fore and aft extending axis with said arms extending ahead of said frame in diverging relation, wheels mounted at the forward ends of said arms, a pair of cultivator supports fixed to said arms and extending forwardly therefrom, the forward ends of said supports having laterally inturned sections, a pair of cultivator rigs disposed between the ends of said arms in laterally spaced relation and having cultivating tools mounted thereon for cultivating a single row of crops therebetween, and means connecting said rigs to the laterally inturned portions of said cultivator supports.

13. In a tractor cultivator, a frame, an operator's seat mounted near the forward end of said frame, a Y-shaped front axle member having a central supporting portion and a pair of diverging arm portions, bearing means at the front end of said frame for rockably mounting said central portion on a fore and aft extending axis with said arms diverging ahead of said frame to provide a clear space therebetween, a wheel mounted at the outer end of each arm portion, a cultivator supporting beam rigidly mounted on each of said arm portions and extending forwardly therefrom, a pair of vertically spaced links pivotally mounted at the forward end of each of said beams and extending rearwardly therefrom, a cultivator rig swingably mounted at the rear end of each of said pairs of links, said rigs being disposed side by side in said clear space within the direct line of vision of an operator seated on said seat, a crank arm connected to one of each pair of links, a pair of operating rods pivotally connected to said crank arms and extending rearwardly therefrom across the adjacent axle arm portion, generally at the outermost part thereof, and at opposite sides of said clear space, respectively, and means connected with said pair of operating rods to raise and lower said rigs.

14. In a tractor cultivator, a frame, a Y-shaped front axle member having a central supporting portion and a pair of diverging arm portions, bearing means at the forward end of said frame for rockably mounting said central portion on a fore and aft extending axis with said arms extending ahead of said frame in diverging relation, wheels mounted at the forward ends of said arms, and a pair of cultivator supporting beams rigidly fixed to said arms adjacent the forward ends thereof, respectively, and extending forwardly therefrom, each of said beams having laterally inwardly directed sections extending inwardly toward each other but terminating at their inner ends in laterally spaced relation to permit a row of crops to pass therebetween, a pair of cultivator rigs disposed between said supporting beams in laterally spaced relation and having cultivating tools mounted thereon for cultivating said crop row therebetween, and means connecting said rigs to said laterally inner end portions of said laterally inwardly directed sections, respectively, providing for vertical movement of said rigs relative thereto.

THEOPHILUS BROWN.

REFERENCES CITED

The following references are of record in the file of this patent:

UNITED STATES PATENTS

| Number | Name | Date |
| --- | --- | --- |
| 1,085,438 | Knight | Jan. 27, 1914 |
| 1,472,888 | Rose | Nov. 6, 1923 |
| 1,476,687 | Brown | Dec. 11, 1923 |
| 1,671,507 | Boldt | May 29, 1928 |
| 1,769,103 | Benjamin | July 1, 1930 |
| 1,776,242 | Altgelt | Sept. 23, 1930 |
| 2,134,848 | Anderson | Nov. 1, 1938 |
| 2,296,501 | Carlson | Sept. 22, 1942 |
| 2,341,181 | Johnson | Feb. 8, 1944 |
| 2,364,367 | Janke | Dec. 5, 1944 |